June 2, 1959 W. G. COBB 2,888,878
NEUTRONIC REACTOR FUEL PUMP
Filed June 16, 1958 2 Sheets-Sheet 1

INVENTOR.
William G. Cobb
BY
*Roland A. Anderson*
ATTORNEY

June 2, 1959 W. G. COBB 2,888,878
NEUTRONIC REACTOR FUEL PUMP
Filed June 16, 1958 2 Sheets-Sheet 2

INVENTOR.
William G. Cobb
BY
ATTORNEY

United States Patent Office 2,888,878
Patented June 2, 1959

2,888,878

NEUTRONIC REACTOR FUEL PUMP

William G. Cobb, Oak Ridge, Tenn., assignor to the United States of America as represented by the United States Atomic Energy Commission Application June 16, 1958, Serial No. 742,451

7 Claims. (Cl. 103—103)

My invention relates generally to long-lifetime pumps and more particularly to pumps adapted to circulate radioactive neutronic reactor fuels.

A long pump lifetime is desirable in all pumping situations; but it becomes necessary in the circulating-fuel, neutronic-reactor art, because pumps used in this art are usually placed in highly radioactive environments where frequent maintenance is extremely difficult, if not impossible. Where the operating lifetime of a reactor is relatively short, as is the case in that portion of the art which is concerned primarily with light, compact, and mobile reactors for vehicular propulsion, the problem of pump longevity is not critical. However, in the portion of the art which deals with reactors for central power stations, where economics dictate a long operating lifetime for the reactor utilized, pump longevity is a necessity.

Pumps which circulate neutronic reactor fuels are necessarily more complex than pumps used in similar chemical environments, since many problems arising from the radioactivity of neutronic reactor environments are added to the corrosion which is encountered in purely chemical situations. For example, a circulating neutronic-reactor fuel may pass through a pump only a fraction of a second after it has been amassed in a neutron reactive configuration and is, consequently, emitting delayed neutrons and gamma rays. Materials of construction undergo a change in their properties when irradiated; therefore pump materials, especially conventional bearing lubricants and the pump motor windings, are susceptible to radiation damage which will ultimately lead to a premature pump failure. Also, all circulating fuels carry entrained gaseous products of the fission reaction, which are also highly radioactive, and which can become de-entrained from the circulating stream and seep into the pump motor to cause more rapid deterioration of the windings. It is necessary to remove these gaseous fission products from the fuel for reasons of neutron economy and reactor stability; therefore, it would be desirable to effect the removal in the pump and, thereby, minimize the amount of equipment through which the fuel must be passed.

A general object of my invention is, therefore, to provide a neutronic-reactor fuel pump having a long operative lifetime.

Another object of my invention is to provide a neutronic-reactor fuel pump, wherein radiation damage to bearing lubricants is eliminated.

Another object of my invention is to provide a neutronic-reactor fuel pump, wherein radiation damage to the pump motor is minimized.

A further object of my invention is to provide a neutronic-reactor fuel pump, wherein gaseous fission product removal and fuel circulation are effected simultaneously.

These and other objects of my invention will become apparent from the following detailed description of my invention when read in conjunction with the appended drawings, wherein.

In accordance with the principles of my invention, I provide a pump comprising a rotatable shaft having first and second ends and being provided with an impeller and impeller housing at its first end; a journal rigidly attached to the second end of the shaft, the journal being a solid body of rotation symmetrical about the axis of the shaft, the dimension of the journal, which is perpendicular to the axis of the shaft, being divergent in a direction opposite to the direction of the thrust load on the shaft; a hydrostatic gas-lubricated bearing member, adapted to receive the journal, provided with a multiplicity of channels adapted to introduce a lubricating gas such as helium to the journal-bearing interface; a liquid expansion chamber, located adjacent the first end, which communicates with the shaft channel and is provided with liquid-gas contacting means, an exit gas aperture, and a liquid return line to the inlet port of the impeller housing; a tubular member surrounding the shaft between the bearing and the expansion chamber and spaced therefrom to provide a continuous channel along the shaft connecting the bearing-journal interface and the expansion chmaber, whereby at least a portion of the gas escaping from the interface may be conducted to the expansion chamber. I additionally provide pumping means having an inlet adjacent the impeller center and an outlet communicating with the aforementioned contacting means, and a second bearing at the first end of the shaft.

In the pump which I provide, the gas which lubricates the hydrostatic bearing serves additionally as a shaft sealant, and, as a recipient for gaseous contaminants of the fuel (usually gaseous fission products), when it is contacted with the fuel in the expansion chamber at the lower end of the shaft. Inert gases such as helium are usually unaffected by radiation and retain their lubricating properties under highly radioactive conditions.

The journal which turns in the hydrostatic bearing may be of any generally divergent shape but it is preferably hemispherical in shape, as will be illustrated below in the description of a preferred embodiment, because such shape allows angular displacement of the shaft without causing binding in the bearing.

The small portion of inlet flow which is taken from the inlet stream and introduced into the expansion tank may be conveniently and is preferably accomplished by the pumping action of a hollow shaft provided with radial apertures, as will also be illustrated below in connection with the description of the preferred embodiment of my invention.

The lower bearing which prevents angular displacement of the shaft is suitably and preferably of the hydrostatic type and may be lubricated with the liquid being pumped, as will also be illustrated below.

Figure 1:
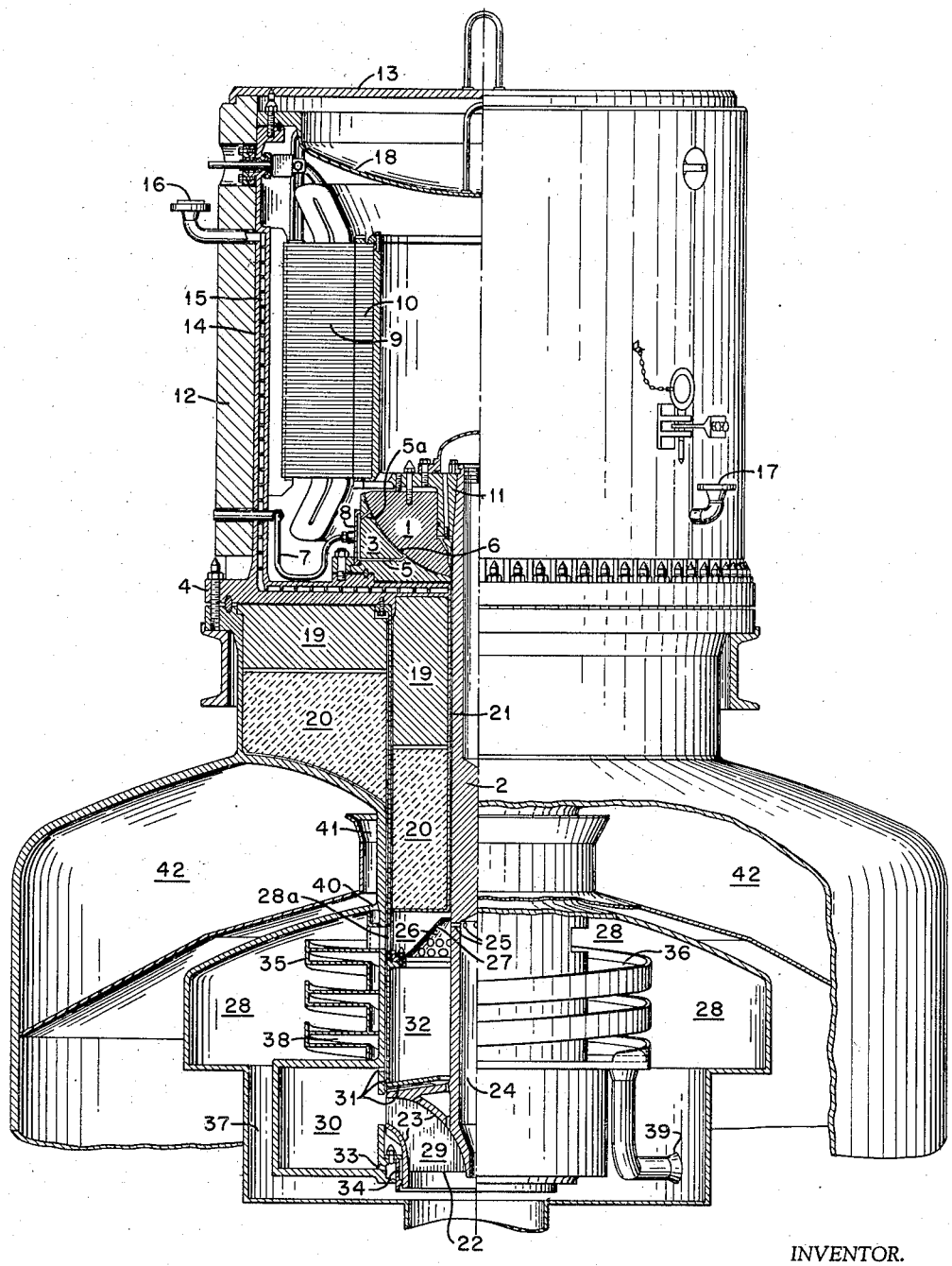
Fig. 1 is a partial vertical section of a pump adapted to meet the above objects.

Referring to Fig. 1, a hemispherical journal 1, which is rigidly and coaxially mounted at the upper end of a rotatable shaft 2, turns in a hemispherical gas-lubricated bearing 3, which is rigidly attached to a stationary frame 4. The bearing is provided with a multiplicity of internal channels 5 and 5a through which the lubricating gas is introduced to the bearing-journal interface 6. Gas is supplied to the channels 5 and 5a by means of an inlet line 7 and a gas header 8. The shaft and journal are rotated by an electric motor comprising a stator 9 and a rotor 10, which rotor is rigidly affixed to the journal by means of a connector 11. Surrounding the entire motor is a nuclear radiation shield 12 maintained by a shield retainer 13. Within the shield, as an integral part of the wall of the motor chamber, is a chamber cooler 14, which comprises a multiplicity of helical coolant passageways 15, through which a low temperature coolant is passed, from an inlet 16 to an outlet 17. A sealing head 18 encloses the motor chamber at its top. A portion of the gas, which serves as the bearing lubricant, continuously escapes into and completely fills the motor and is continuously withdrawn therefrom through an aperture (not shown) in the motor chamber wall. Helium, which is preferably used as the lubricating gas, effectively conducts and convects heat away from the motor.

Surrounding the shaft are gamma shields 19 and neutron shields 20 which are spaced away from the shaft, thereby defining an annular channel 21, which communicates with the bearing-journal interface 6. The remainder of the gas which is supplied to the interface escapes therefrom and flows downwardly along the shaft through the channel 21, and serves as a seal between the impeller region of the pump and the motor chamber.

Attached to the lower end of the shaft is a mixed flow impeller assembly which consists of impeller vanes 22 maintained by shrouds 23. The lower end of the shaft 2 is hollow thereby defining a chamber 24, and is provided with a multiplicity of radial apertures 25 located at the top of the shaft chamber 24, which connect the chamber with a purge chamber 26. During operation of the pump, fuel is drawn up the shaft chamber 24 and sprayed into the purge chamber 26 by the pumping action of the radial apertures 25. The spray impinges on an apertured frustoconical baffle 27, which is securely mounted within the purge chamber. The purge chamber 26 is connected to the shaft channel 21 and excess lubricant gas which flows downwardly along the shaft is admitted to the purge chamber, where it mixes with the sprayed fuel and flows into the fuel expansion chamber 28, through apertures 28a.

Fuel is discharged from the impeller upwardly through passageways 29, which are defined by the impeller shrouds 23 and vanes 22, and into the impeller housing or volute 30, from which the fuel is discharged through an outlet port (not shown). A small portion of the high pressure fuel in the discharge housing is allowed to escape therefrom through apertures 31 and chamber 32 into the previously described purge chamber 26, where it combines with the sprayed fuel and the lubricating gas and passes into the expansion chamber 28. Another small portion of the high pressure fuel in the discharge housing is allowed to escape through an opening 33 into a second hydrostatic bearing where it serves as a lubricant therefor. The second bearing will be described more fully below.

The fuel expansion tank 28 is an annular chamber which surrounds the lower portion of the shaft 2, the chamber 32, and the purge chamber 26. Within the expansion chamber, a hollow helical ramp 35, rimmed on its upper side to form an open trough 36, is wrapped around the cylindrical chamber 32. Fuel which flows out of the purge chamber 26, spills onto the open trough 36, and flows, by gravity, down the trough to the bottom of the expansion chamber, from which it is returned to the impeller inlet by the fuel return passageway 37. The lubricating gas which enters the expansion chamber fills the chamber and sweeps away gaseous fuel contaminants which issue from the fuel in the helical trough and other liquid surfaces within the expansion chamber. The gas is continuously withdrawn from the expansion chamber through an exit aperture in the chamber wall (not shown).

In the event that the pump fails during operation, the fuel that is on the trough 36 will flow to the bottom of the expansion chamber leaving the ramp surfaces exposed to fission-product gamma and beta irradiation and heating caused thereby. Such heating may be sufficient to melt the ramp and the expansion chamber walls. Consequently, the helical ramp 35 is provided with an internal passageway 38, through which a high temperature coolant is passed, from an inlet 39 to a jacket 42, through the aforementioned passageway 38, opening 40, and passageway 41.

Figures 2, 3:
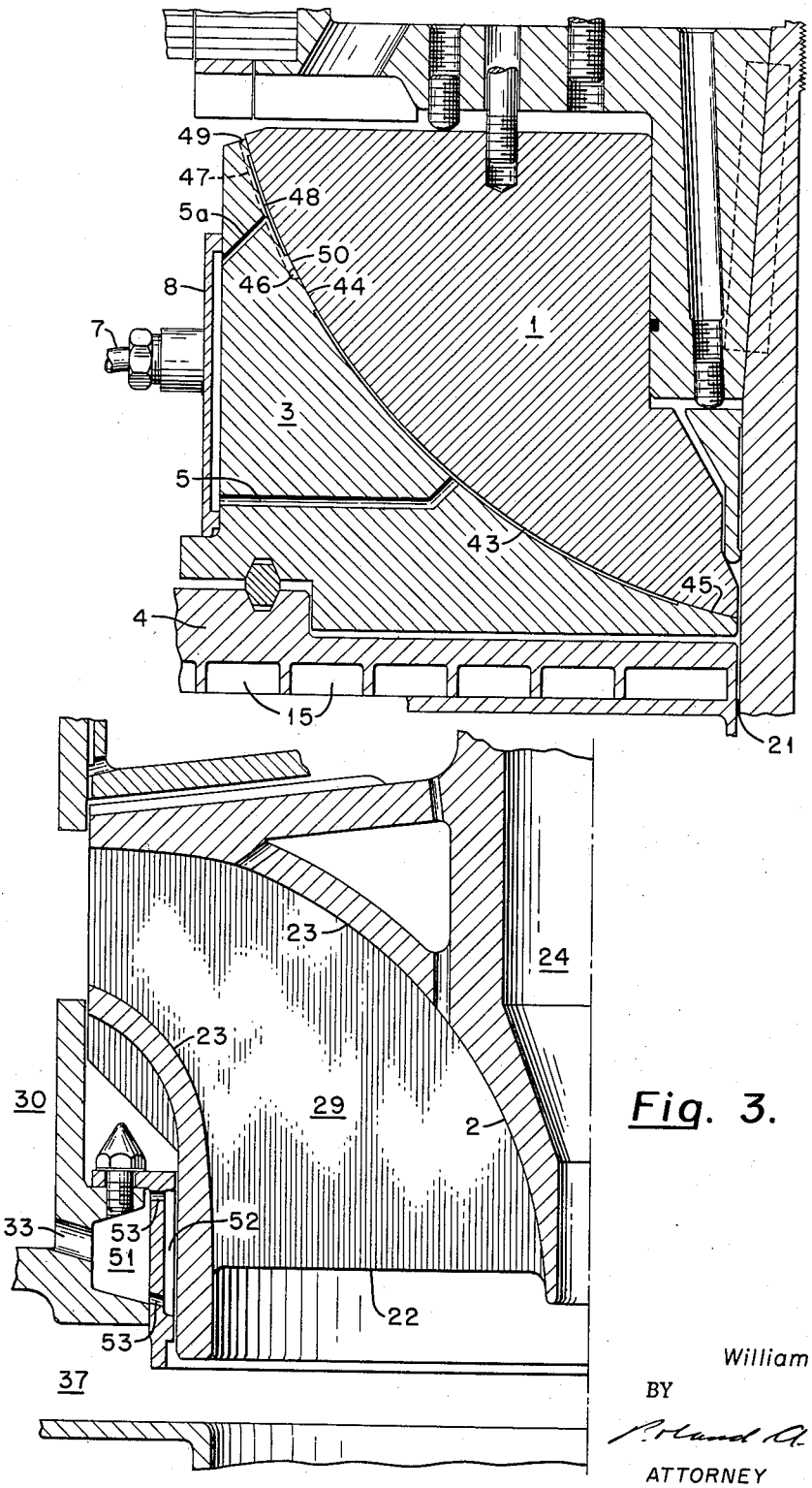
Fig. 2 is a detail view of the radial-thrust bearing of the pump.
Fig. 3 is a detail view of the pilot bearing and the impeller region of the pump.

Referring now to Fig. 2, which is an enlarged view of the upper bearing region, a lubricating gas is supplied to the labyrinthine interface between journal 1 and the bearing 3 through channels 5 and 5a, which are supplied by a gas header 8 and an inlet line 7.

Channels 5 supply gas to a circumferential pocket 43, which, essentially, comprises the thrust load bearing portion of the bearing and which is defined by lands 44 and 45, which are only a few thousandths of an inch in height. Lands 44 and 45 also permit the gas flow through channel 5 to be divided at the interface; one portion flowing upwardly over land 44 and the other portion flowing downwardly over land 45 to the impeller region of the pump. Land 45, in combination with previously described shaft channel 21, effectively seals the motor section of the pump from the gaseous fission-product-contaminated impeller region.

Channels 5a supply gas to the radial load bearing portion of the bearing, which comprises a continuous horizontal groove 46; tributary vertical grooves 47; circumferentially-distributed, orifice-compensated multiple gas pockets 48; and lands 49 and 50. The multiple gas pockets 48 are disposed between the vertical grooves 47, and being orifice-compensated inhibit lateral displacement of the hemispherical journal, and, in the absence of an external lateral force, automatically center the journal within the bearing. Gas which escapes from pocket 43 over land 44 and gas which escapes from pockets 48 over land 50, is collected and transmitted, by means of the horizontal groove 46 and tributary vertical grooves 47, upwardly to the motor cavity of the pump.

Referring now to Fig. 3, which is an enlarged view of the lower bearing region, high pressure fuel in the discharge housing is admitted to the lower hydrostatic bearing, through openings 33, into a circumferential plenum chamber or header 51. (The outer portion of the impeller shroud 23, which is integral with the shaft through the impeller vanes 22, serves as the lower shaft journal.) Fuel is admitted to a multiplicity of circumferentially disposed pockets 52 at the journal-bearing interface, through orifices 53, where it serves as a bearing lubricant.

The embodiment described above may be suitably used to pump the high-temperature, fused fluoride salts which are disclosed and claimed in the co-pending application of the common assignee Serial Number 600,639, filed July 27, 1956 in the names of Charles J. Barton and Warren R. Grimes for "Reactor Fuel Composition." When used for these salts, the pump may be fabricated from the alloys described in another co-pending application of the common assignee Serial Number 718,928, filed March 3, 1958 in the names of Henry Inouye, William D. Manly, and Thomas K. Roche for "Nickel-Base Alloy."

Although the particular embodiment described herein has been described as being particularly suitable for the circulation of neutronic reactor fuels, the principles of my invention are inherently wider in scope and are applicable to non-nuclear pumping situations as well. My invention should, therefore, be limited only as indicated in the appended claims.

What is claimed as novel is:

1. A pump comprising, in combination, a rotatable shaft having first and second ends and being provided with an impeller at its first end; a housing surrounding said impeller provided with at least one discharge port and at least one inlet port; a journal rigidly attached to the second end of said shaft, said journal being a solid body of rotation symmetrical about the axis of said shaft, the dimension of said body, perpendicular to the axis of said shaft, being divergent in a direction opposite to the direction of the thrust load on said shaft, a hydrostatic gas-lubricated bearing member adapted to receive said journal, said bearing member being provided with a multiplicity of channels adapted to supply a continuous stream of lubricating gas to the bearing-journal interface; an expansion chamber, disposed adjacent the first end of said shaft, provided with liquid-gas contacting means and with an exit gas aperture; an expansion chamber drain line connecting said chamber with the inlet port of said housing; a tubular member surrounding said shaft, between said bearing and said expansion chamber, and spaced therefrom to provide a continuous channel along said shaft connecting said journal-bearing interface and said expansion chamber, whereby at least a portion of a gas escaping from said interface may be conducted to said expansion chamber; pumping means having an inlet adjacent the center of said impeller and an outlet communicating with said liquid-gas contacting means within said chamber; and a second bearing disposed at the first end of said shaft to prevent angular displacement thereof.

2. A pump as claimed in claim 1, wherein the journal attached to the second end of said shaft is hemispherical in shape.

3. A pump as claimed in claim 1, wherein the bearing disposed at the first end of said shaft is a hydrostatic bearing, and wherein liquid conducting apertures are provided between said bearing and the discharge housing of the impeller, whereby said bearing may be lubricated by a liquid being circulated by said impeller.

4. A neutronic reactor fuel pump comprising in combination, a substantially-vertically disposed rotatable shaft provided with an impeller at its lower end adapted to apply a downward thrust load to said shaft; a housing surrounding said impeller provided with at least one discharge port and at least one inlet port; a journal attached to the upper end of said shaft, said journal being a solid body of rotation symmetrical about the axis of said shaft and being of upwardly increasing width from its smallest width at said shaft to its greatest width at its upper extremity; a hydrostatic gas-lubricated bearing member adapted to receive said journal, said bearing member being provided with a multiplicity of channels adapted to supply a continuous stream of lubricating gas to the bearing-journal interface; an expansion chamber, disposed adjacent the lower end of said shaft, provided with liquid gas contacting means and with an exit gas aperture; an expansion chamber drain line connecting said chamber with the inlet port of said housing; a relatively thick layer of radiation shielding surrounding said shaft between the lower extremity of said bearing and the impeller region of said shaft, and spaced therefrom to provide a continuous channel along said shaft connecting said bearing interface and said expansion chamber, whereby at least a portion of the gas escaping from said interface may be conducted to said expansion chamber; pumping means having an inlet adjacent the center of said impeller and an outlet communicating with said liquid-gas contacting means within said chamber; and a second bearing disposed at the lower end to said shaft to prevent lateral displacement thereof.

5. A pump as claimed in claim 4, wherein the journal at the upper end of said shaft is hemispherical in shape.

6. A pump as claimed in claim 5, wherein the bearing disposed at the lower end of said shaft is a hydrostatic bearing, and wherein liquid conducting apertures are provided between said bearing and the discharge housing of the impeller, whereby said bearing may be lubricated by a liquid being circulated by said impeller.

7. A pump as claimed in claim 6, wherein the liquid-gas contacting means is a helical ramp adapted to conduct a liquid by gravity flow.

References Cited in the file of this patent

UNITED STATES PATENTS

| | | |
|---|---|---|
| 1,027,947 | Widye | May 28, 1912 |
| 1,736,002 | Frickey et al. | Nov. 19, 1929 |
| 2,075,895 | Harmon | Apr. 6, 1937 |
| 2,185,048 | Wood | Dec. 6, 1939 |
| 2,468,704 | Pippin | Apr. 26, 1949 |
| 2,695,198 | Brugger | Nov. 23, 1954 |
| 2,695,199 | Blizard | Nov. 23, 1954 |
| 2,764,943 | Peters | Oct. 2, 1956 |
| 2,834,619 | McNab | May 13, 1958 |